UNITED STATES PATENT OFFICE

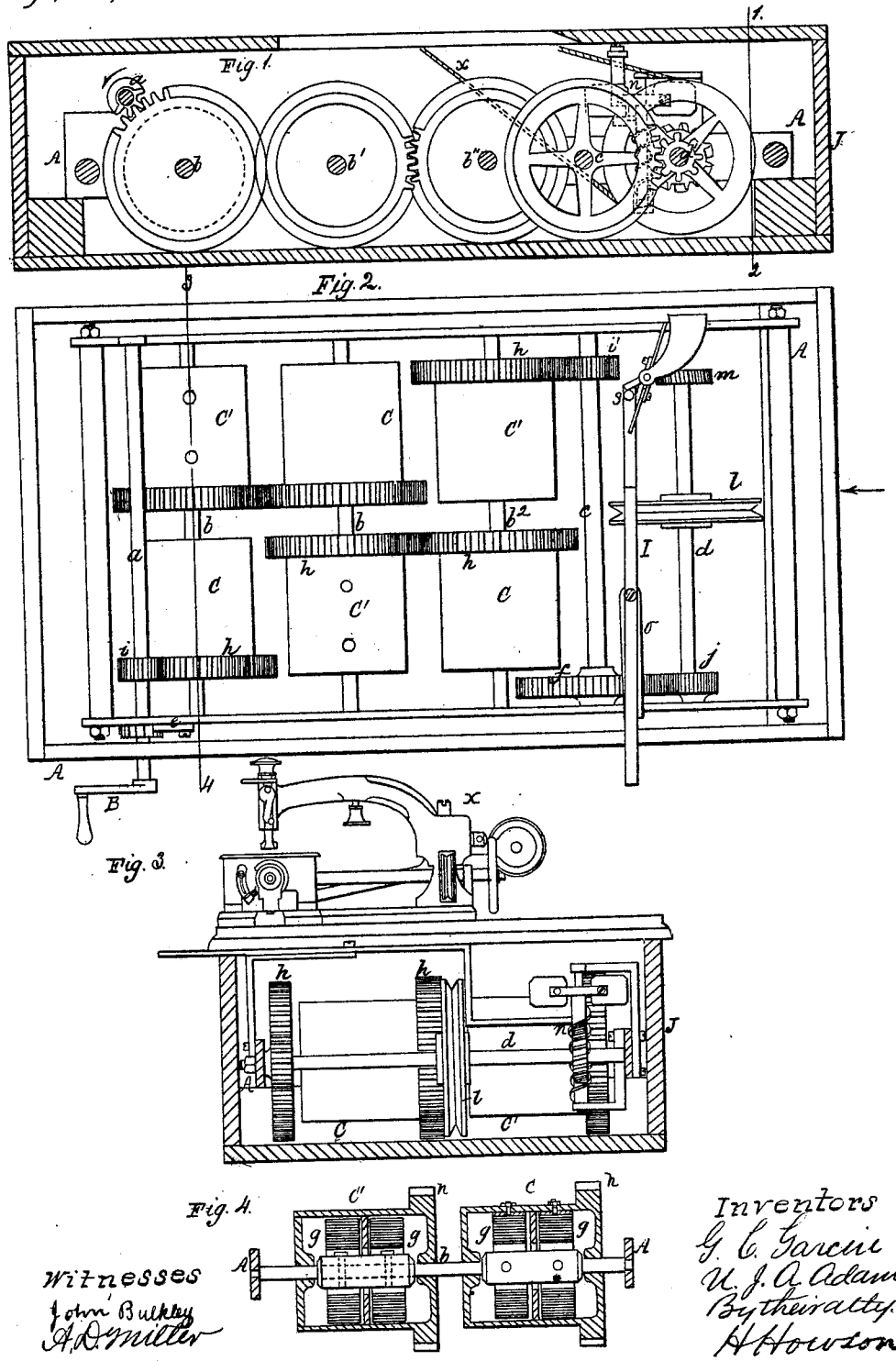

CAROLINE GARCIN AND U. ADAM, OF COLMAR, FRANCE.

MECHANISM FOR DRIVING SEWING-MACHINES.

Specification forming part of Letters Patent No. 91,327, dated June 15, 1869.

*To all whom it may concern:*

Be it known that we, CAROLINE GARCIN and U. ADAM, of Colmar, France, have invented an Improvement in Motors for Driving Sewing-Machines, &c.; and we do hereby declare the following to be a full, clear, and exact description of the same.

Our invention consists of certain shafts and spring-barrels geared together and operating in connection with certain stopping and starting mechanism, as fully described hereafter, the whole forming a motor especially adapted for driving sewing-machines.

In order to enable others skilled in the art to make and use our invention, we will now proceed to describe its construction and operation, reference being had to the accompanying drawing, which forms a part of this specification, and in which—

Figure 1 is a longitudinal section of our improved apparatus for driving sewing-machines, &c.; Fig. 2, a plan view; Fig. 3, a section on the line 1 2, Fig. 1, looking in the direction of the arrow; and Fig. 4, a section on the line 3 4, Fig. 1.

A is a longitudinal metal frame, in which turn the parallel shafts $a$, $b$, $b^1$, $b^2$, $c$, and $d$, the shaft $a$ being provided with a crank-handle, B, and with a ratchet-wheel, to which is adapted a pawl, $e$, the latter preventing the shaft from turning except in the direction of its arrow, Fig. 1. On each of the shafts $b$ $b^1$ $b^2$ turn two barrels, $c$ $c^1$, each containing, in the present instance, two coiled springs, $g$ $g$, and on the ends of the barrels are cog-wheels $h$, which gear with each other, as shown in Fig. 2, a pinion, $i$, on the shaft $a$ gearing with the wheel $h$ of the adjacent drum C, and a pinion, $i'$, on the shaft $c'$, gearing with the wheel $h$ of the adjacent drum C'. A wheel, $f$, on the shaft $c$ gears with a pinion, $j$, on the shaft $d$, and on the latter are a grooved pulley, $l$, and a worm-wheel, $m$, adapted to a worm on a vertical fly-shaft, $n$. To a bracket, $o$, is hinged an arm, I, which projects beyond the frame, and has at the inner end a pin, $s$. The frame A, with its shafts, is arranged within a suitable casing, J, supporting a sewing-machine, X, to the driving-pulley of which passes a band, $x$, from the grooved pulley $l$. The springs $g$ within the drums are secured at their outer ends to the drums, and at their inner ends to the shafts on which the drums turn, and are so arranged that, on turning the shaft $a$ in the direction of its arrow, the springs will be successively contracted, those within the drum C of the shaft $b$ being first coiled, or partly coiled, on the shaft, then turning the latter, so as to compress the springs in the drum C', which is also caused to revolve after the springs it contains are compressed, and thus transmits motion to the drum C of the next shaft, and so on until all the springs are wound upon their respective shafts. The apparatus remains stationary so long as the pin $s$ of the lever I is in contact with the arms of the fly-shaft. On removing it, however, the shaft will be at liberty to revolve, and the motion imparted to the shaft $d$ by the action of the springs will be communicated, through the medium of the belt $x$, to the sewing-machine. On moving the lever I to its first position the motion of the machine will be arrested.

By adjusting the wings of the fly-shaft the speed of the apparatus may be regulated at pleasure.

Although we have described the driving mechanism as applied to a sewing-machine, it will be apparent that it may be used for driving light machines of various kinds.

We claim as our invention and desire to secure by Letters Patent—

The arrangement, as herein described, of the shafts $a$ $b$ $c$, with their barrels C, springs $g$, cog-wheels and pinions, the shaft $d$, with its pulley $l$ and worm-wheel $m$, the worm-shaft $n$, and lever I, for the purpose set forth.

In testimony whereof we have signed our names to this specification in the presence of two subscribing witnesses.

CAROLINE GARCIN.
U. ADAM.

Witnesses:
S. BICHAR,
F. OLCOTT.